United States Patent [19]

Batterham et al.

[11] Patent Number: 5,512,217
[45] Date of Patent: Apr. 30, 1996

[54] REACTOR AND METHOD OF USE

[75] Inventors: Robin J. Batterham, Sandringham; Warwick A. Hoffmann, Northcote; David S. Conochie, Hawthorn East, all of Australia

[73] Assignee: Technological Resources Pty. Limited, Australia

[21] Appl. No.: 196,132

[22] PCT Filed: Jul. 9, 1993

[86] PCT No.: PCT/AU93/00340

§ 371 Date: Mar. 16, 1994

§ 102(e) Date: Mar. 16, 1994

[87] PCT Pub. No.: WO94/01210

PCT Pub. Date: Jan. 20, 1994

[30] Foreign Application Priority Data

Jul. 9, 1992 [AU] Australia ................................. PL3436
Jul. 9, 1992 [AU] Australia ................................. PL3437

[51] Int. Cl.⁶ .................................................. B01F 3/04
[52] U.S. Cl. ............................ 261/36.1; 261/91; 261/93; 261/DIG. 75
[58] Field of Search ...................... 261/91, 93, DIG. 75, 261/36.1

[56] References Cited

U.S. PATENT DOCUMENTS

| 897,735 | 9/1908 | Goldberg. |
| 1,808,956 | 6/1931 | Ketterer. |
| 2,708,571 | 5/1955 | Fischerstrom et al. ........... 261/DIG. 75 |
| 2,719,032 | 9/1955 | Schnur ............................ 261/DIG. 75 |
| 3,350,302 | 10/1967 | Demeter et al. .......................... 210/45 |

(List continued on next page.)

FOREIGN PATENT DOCUMENTS

| 483997 | 12/1975 | Australia. |
| 9791 | 6/1992 | Australia. |
| 3436 | 1/1993 | Australia. |
| 0225237 | 6/1987 | European Pat. Off.. |
| 0224801 | 6/1987 | European Pat. Off.. |
| 58-14910 | 1/1983 | Japan. |
| 1294466 | 10/1972 | United Kingdom. |
| 1405264 | 9/1975 | United Kingdom. |
| 1484657 | 9/1977 | United Kingdom. |
| 1524765 | 9/1978 | United Kingdom. |
| 2011369 | 7/1979 | United Kingdom. |
| 1549523 | 8/1979 | United Kingdom. |
| 2013095 | 8/1979 | United Kingdom. |
| 1568820 | 6/1980 | United Kingdom. |
| 1583881 | 2/1981 | United Kingdom. |
| 2072027 | 9/1981 | United Kingdom. |
| 1597391 | 9/1981 | United Kingdom. |
| 2077712 | 12/1981 | United Kingdom. |
| 2077608 | 12/1981 | United Kingdom. |
| 2107696 | 5/1983 | United Kingdom. |
| 2118449 | 11/1983 | United Kingdom. |
| 2142553 | 1/1985 | United Kingdom. |
| 2179647 | 3/1987 | United Kingdom. |
| 2182322 | 5/1987 | United Kingdom. |
| 2207668 | 2/1989 | United Kingdom. |
| 2236103 | 3/1991 | United Kingdom. |

*Primary Examiner*—Tim R. Miles
*Attorney, Agent, or Firm*—Merchant, Gould, Smith, Edell, Welter & Schmidt

[57] ABSTRACT

A reactor for introducing gas into a fluid comprises a mixing tank (12, 43) for the fluid and a partition means (13,45) for dividing the tank into at least two chambers (21, 89) and (23, 91). The reactor further comprises a first pump means (14, 47) located in one of the chambers for circulating the fluid downwards in one chamber and then upward in the other chamber and an aerator assembly (29, 49) for aerating a sidestream of the fluid and introducing the aerated fluid into the tank for mixing the aerated fluid with the circulating fluid in the tank. The aerator assembly comprises a bank of venturi aerators (38, 57) each having an aerator inlet; an aerator outlet; and a constriction intermediate the aerator inlet and the aerator outlet for creating a region of reduced pressure in the fluid, the constriction being elongate in a section transverse to the direction of flow of the fluid through the constriction; and a means for introducing the gas into the constriction to aerate the fluid.

36 Claims, 8 Drawing Sheets

U.S. PATENT DOCUMENTS

| | | | |
|---|---|---|---|
| 3,371,618 | 3/1968 | Chambers | 103/258 |
| 3,439,807 | 4/1969 | Danjes | 261/DIG. 75 |
| 3,592,586 | 7/1971 | Scott | 23/79 |
| 3,680,698 | 8/1972 | Liu et al. | 210/46 |
| 3,691,230 | 9/1972 | Wesselingh | 261/DIG. 75 |
| 3,723,545 | 3/1973 | Nagel et al. | 260/635 Y |
| 3,932,275 | 1/1976 | Mewes et al. | 210/49 |
| 4,000,227 | 12/1976 | Garrett | 261/93 |
| 4,017,565 | 4/1977 | Muller | 261/36 R |
| 4,051,204 | 9/1977 | Muller et al. | 261/36 R |
| 4,193,950 | 3/1980 | Stockner et al. | 261/93 |
| 4,196,074 | 4/1980 | Garrett et al. | 210/3 |
| 4,267,052 | 5/1981 | Chang | 210/629 |
| 4,273,731 | 6/1981 | Laurie et al. | 261/DIG. 75 |
| 4,290,885 | 9/1981 | Kwak | 261/93 |
| 4,465,597 | 8/1984 | Herman et al. | 210/713 |
| 4,483,826 | 11/1984 | Louthan | 422/225 |
| 4,521,307 | 6/1985 | Reid | 261/DIG. 75 |
| 4,708,829 | 11/1987 | Bylehn et al. | 261/DIG. 75 |
| 4,743,405 | 5/1988 | Durao et al. | 261/76 |
| 5,004,571 | 4/1991 | Litz et al. | 261/91 |
| 5,043,104 | 8/1991 | Stirling | 261/93 |
| 5,108,662 | 4/1992 | Litz et al. | 261/91 |

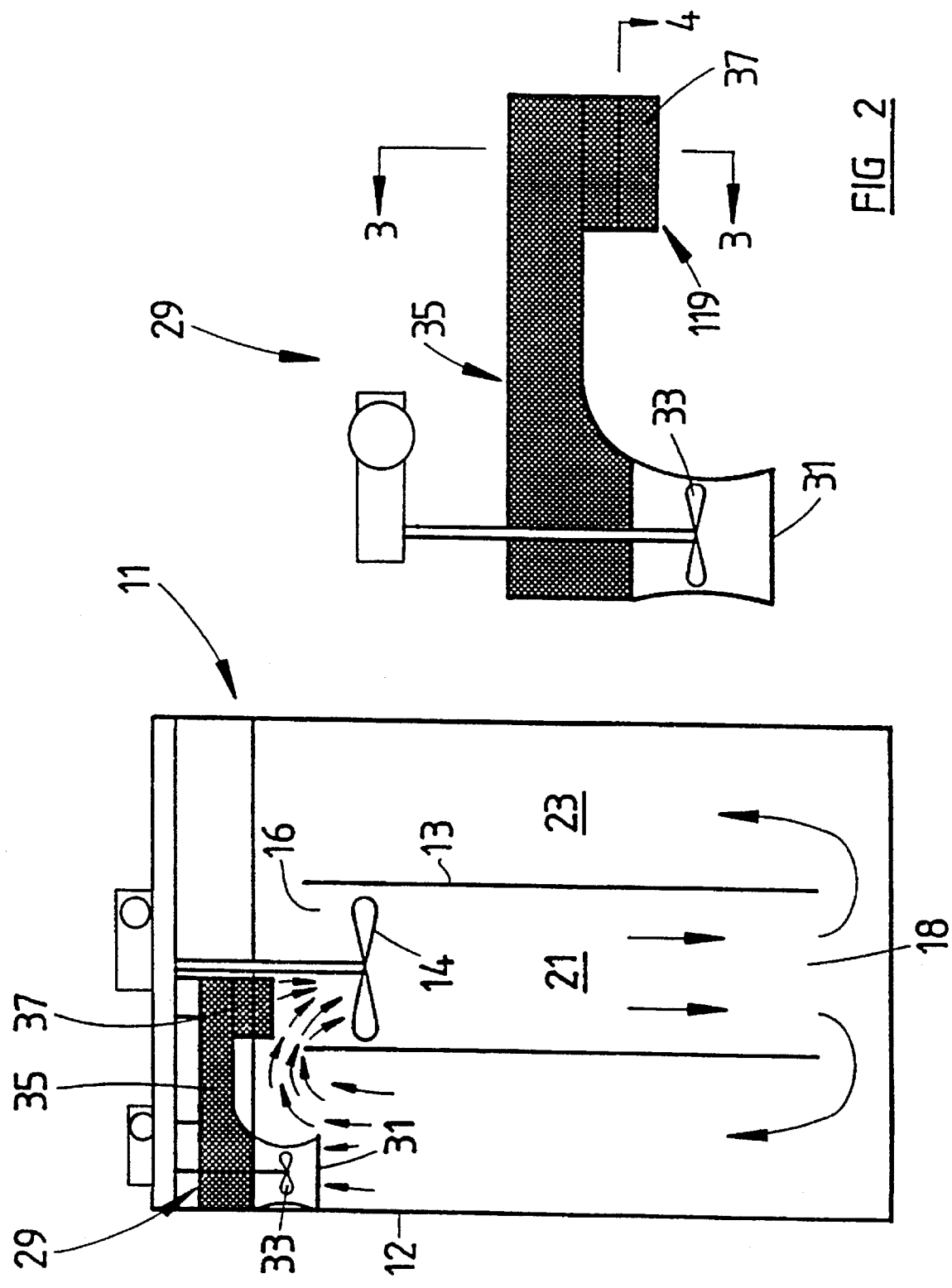

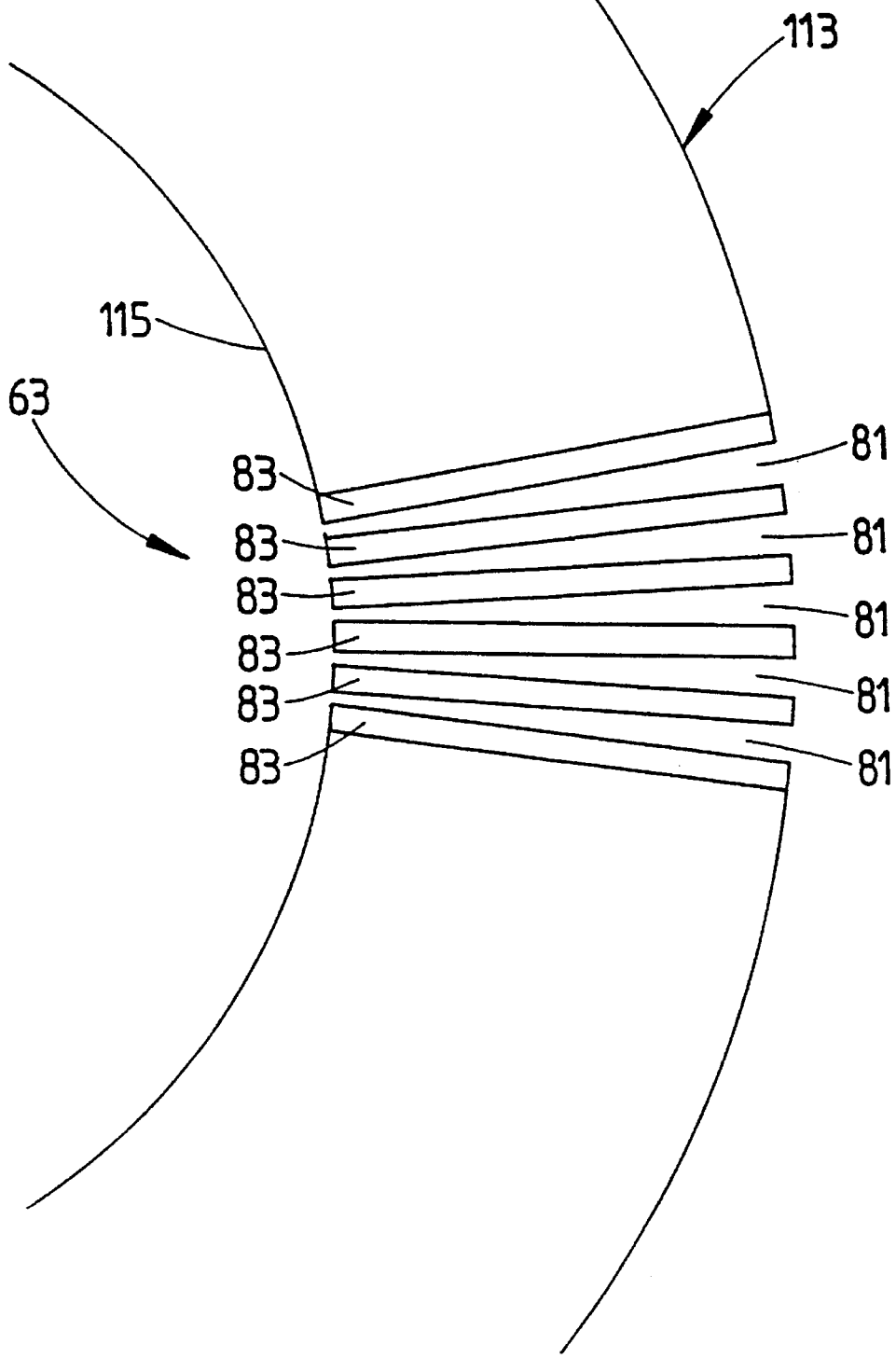

REACTOR AND METHOD OF USE

This application is a 371 of PCT/AU93/00340, filed Jul. 9, 1993.

FIELD OF THE INVENTION

The invention relates to a reactor for a two-phase or a three-phase system.

The invention has particular application to the aeration of a fluid comprising a slurry of mineral particles with a gas comprising air or any other suitable oxygen-containing gas. However, the invention is not restricted to this application and extends to the aeration of any gas/liquid, gas/liquid/solid or gas/liquid/solid/microbial systems.

The term "aeration" is understood to mean herein the injection of a gas or gases into a fluid.

BACKGROUND OF THE INVENTION

International application PCT/AU92/00645 entitled "Reactor" lodged on Dec. 2, 1992 in the name of the applicant discloses a reactor for aerating a fluid with a gas.

The reactor comprises a mixing tank for the fluid, a centrally located draft tube that partitions the mixing tank into a central chamber and an annular chamber which are in fluid communication at upper and lower regions of the mixing tank, and an axial flow pump located in the draft tube for circulating the fluid downwards in the draft tube and upwards in the annular chamber. The reactor also comprises an external circuit that removes a sidestream of the fluid from the mixing tank, aerates the fluid, and returns the aerated fluid to the mixing tank. The external circuit comprises an aerator in the form of a venturi of frusto-conical design having holes or a porous membrane in the region of the throat of the venturi for introducing the gas into the fluid. The aerator takes advantage of the fact that the fluid pressure in the throat region of the venturi is less than that upstream and downstream of the throat region and enables the air to be introduced into the liquor by natural aspiration or at low pressure. The external circuit further comprises a centrifugal pump for pumping the fluid around the external circuit.

The reactor disclosed in the International application is an effective means of aerating a fluid. This is reflected in the experimental results in the International application which show a decrease in power requirements with the reactor when compared with a conventional air agitated reactor.

An object of the present invention is to provide a reactor for introducing a gas into a fluid which is capable of achieving a further significant decrease in power requirements when compared with the reactor disclosed in International application PCT/AU92/00645.

SUMMARY OF THE INVENTION

According to one aspect of the invention there is provided a reactor for introducing a gas into a fluid comprising, a mixing tank for the fluid, a partition means for dividing the tank into at least two chambers, a first pump means located in one of the chambers for circulating the fluid downwards in one chamber and then upwards in the other chamber, an aerator assembly for aerating a sidestream of the fluid and introducing the aerated fluid into the tank for mixing the aerated fluid with the circulating fluid in the tank, the aerator assembly comprising a venturi aerator having:
(a) an aerator inlet;
(b) an aerator outlet;
(c) a constriction intermediate the aerator inlet and the aerator outlet for creating a region of reduced pressure in the fluid, the constriction being elongate in a section transverse to the direction of flow of the fluid through the constriction; and
(d) a means for introducing the gas into the constriction to aerate the fluid.

The term "elongate" as used herein is understood to mean that the ratio of the length and width dimensions of the constriction be at least 1.5:1.

According to another aspect of the invention there is provided a reactor for introducing a gas into a fluid comprising, a mixing tank for the fluid, a partition means for dividing the tank into at least two chambers and for allowing the fluid to flow between the chambers, a first pump means located in one of the chambers for circulating the fluid downwards in one chamber and then upwards in the other chamber, an aerator assembly located in an upper region of the tank for aerating a sidestream of fluid and introducing the aerated fluid into the tank for mixing the aerated fluid with the circulating fluid in the tank, the aerator assembly comprising a venturi aerator for the fluid.

According to another aspect of the invention there is provided a method of aerating a fluid with a gas comprising, creating a region of reduced fluid pressure which is elongate in a section transverse to the direction of flow of the fluid through the region of reduced fluid pressure, and introducing the gas into the fluid in the region of reduced fluid pressure to aerate the fluid.

DESCRIPTION OF THE DRAWINGS

The invention is described further with reference to the accompanying drawings in which:

FIG. 1 represents schematically one preferred embodiment of a reactor formed in accordance with the invention;

FIG. 2 is a detailed schematic representation of the aerator assembly of the reactor shown in FIG. 1;

FIG. 9 is an enlarged partial section of the throat region of the aerator assembly along the line 9—9 of FIG. 8.

DETAILED DESCRIPTION OF THE INVENTION

Figure 3:
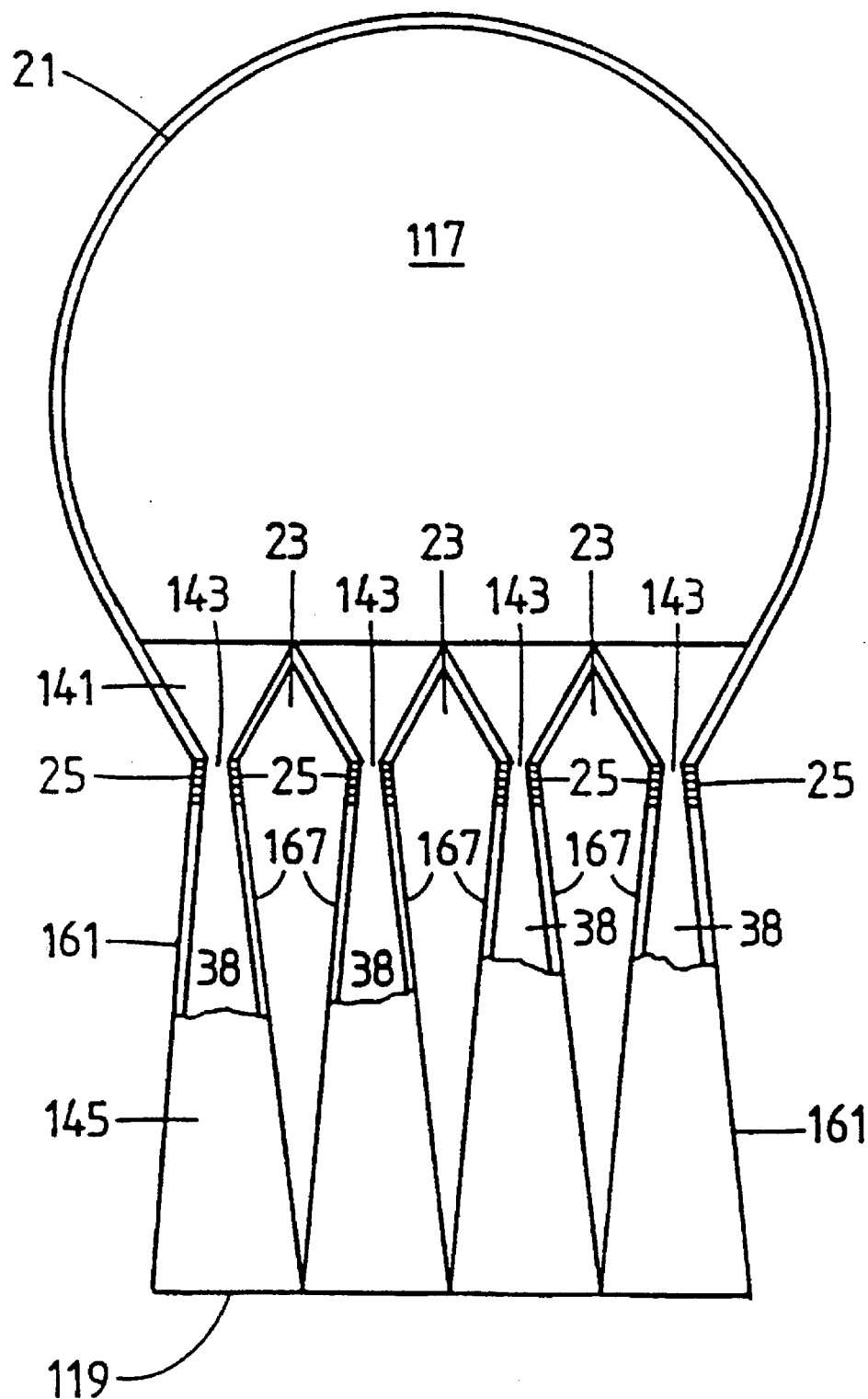
FIG. 3 is an enlarged section along the line 3—3 in FIG. 2.

The preferred embodiments of the reactor of the invention are described herein in relation to the aeration of a slurry of a mineral and water with air. However, it is noted that the invention is not restricted to this application and extends to the aeration of any fluid with any gas.

The preferred embodiment of the reactor 11 shown in FIGS. 1 and 2 comprises a cylindrical mixing tank 12 containing the slurry, a vertical draft tube 13 submerged in the slurry, and a motor driven axial flow impeller 14 located in the draft tube 13 near the top thereof.

The tank 12 may be of any suitable size. The draft tube 13 has open upper and lower ends 16, 18 and is located centrally in the mixing tank 12 to divide the mixing tank 12 into an inner chamber 21 and an outer annular chamber 23. In use, the impeller 14 induces a flow of the slurry downwards in the draft tube 13 and then upwards in the outer annular chamber 23, as indicated by the arrows in the figure. The flow of the slurry is controlled so that the mineral particles are kept in suspension.

The reactor 11 further comprises an aerator assembly, generally identified by the numeral 29, supported by any suitable means (not shown) to extend into an upper region of the tank 12.

The aerator assembly 29 comprises an inlet 31 for slurry located in the tank 12 adjacent the side wall of the tank 12 and a motor driven axial flow impeller 33 located in the inlet 31 for drawing a portion of the slurry circulating upwardly in the outer chamber 23 of the tank 12 through the inlet 31 into the aerator assembly 29. A channel 25 connects the inlet 31 to a venturi aerator 37 located generally above the draft tube 13 so that aerated slurry from the venturi aerator 37 discharges into the tank 12 upstream of the impeller 14 and thereafter flows downwardly in the draft tube 13 and mixes with the circulating slurry.

Figure 4:
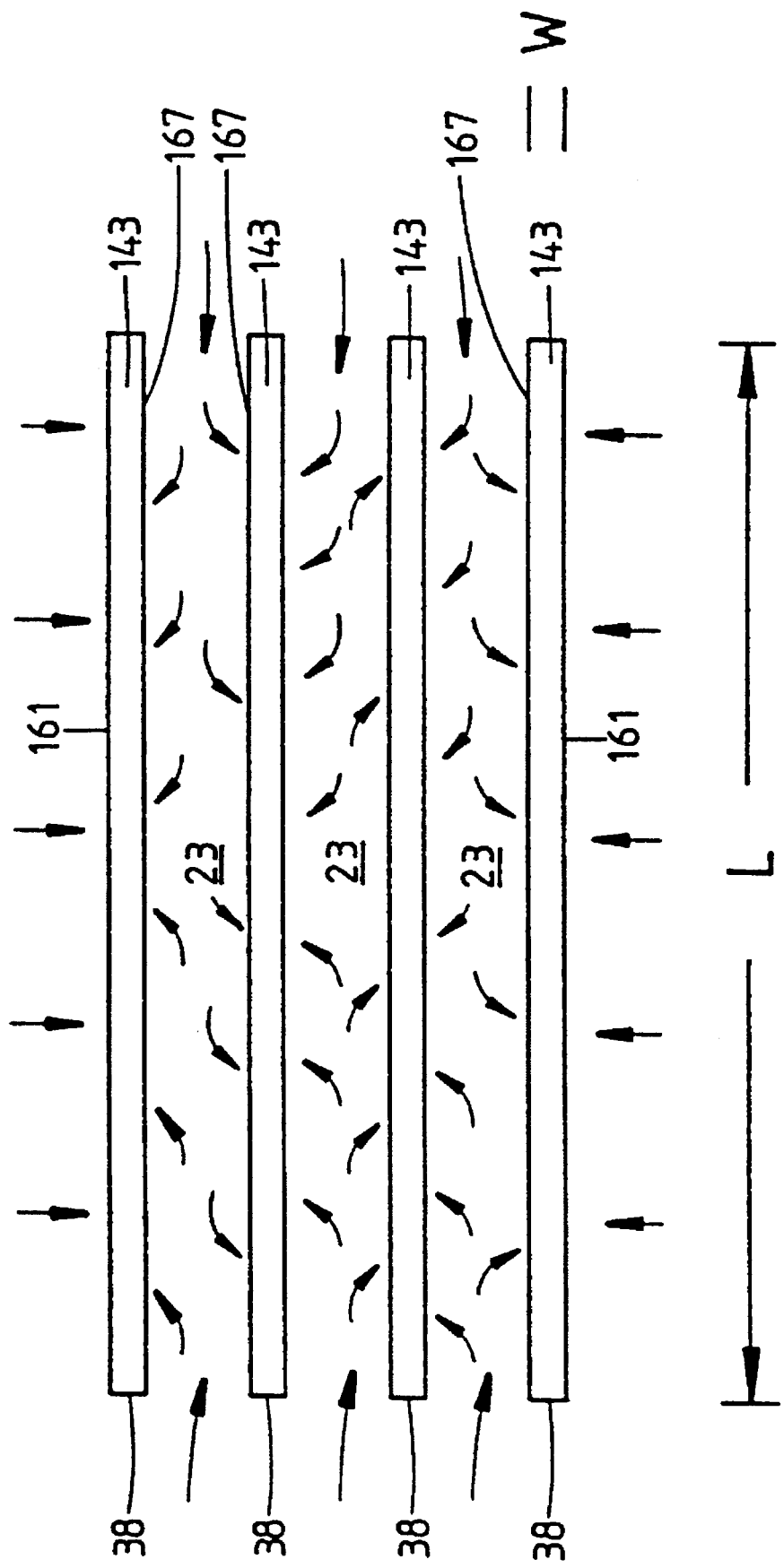
FIG. 4 is an enlarged section along the line 4—4 in FIG. 2.

With reference to FIGS. 3 and 4, the venturi aerator 37 comprises a bank of four aerators 38 arranged in parallel with a common inlet 117, which is an extension of the channel 35, and a common outlet 119 for the aerated fluid. The aerators 38 are separated by a series of three parallel open ended air delivery channels 23 which are generally diamond-shaped in transverse section.

With reference to FIG. 4, the air delivery channels 23 are open-ended so that air can flow without restriction into the chambers 25, as indicated by the arrows in the figure.

With reference to FIG. 3, each aerator 38 comprises an inlet region 141 which tapers inwardly from the inlet 117, a throat region 143, and an outlet region 145 which tapers outwardly towards the outlet 119.

With reference to FIG. 4, each throat region 143 is in the form of an elongate slot of length L and width W in a section transverse to the direction of flow of the fluid through the aerator 38.

The throat length L and throat width W may be of any suitable dimensions. In this context the dimensions are dependent on a number of factors including, but not limited to, the size and operating parameters of the reactor, and the aeration requirements of the fluid. By way of example, the ratio of L:D may be 10:1 for some situations, 100:1 in other situations, and 500:1 or more in other situations.

As is readily apparent from FIG. 3, the cross-sectional area of the throat region 143 is less than that of the inlet region 141 and the outlet region 145 so that fluid flowing through the throat region 143 is subject to a venturi effect with the result that, in accordance with the Bernoulli equations, the fluid pressure in the throat region 143 is less than that in the inlet region 141 and the outlet region 145.

With reference to FIGS. 3 and 4, each aerator 38 further comprise a plurality of holes 25 in the walls 167 of the air delivery chambers 23 and the side walls 161 of the venturi aerator 37 for introducing air into the throat regions 143 of the aerators 38 to aerate the fluid flowing through the throat regions 143. In view of the reduced fluid pressure in the throat regions 141 the air may be introduced by natural aspiration or at low pressure thereby minimising capital and operating costs of the aerator assembly 37. The holes 25 are located at spaced intervals substantially around the perimeter of the throat regions 143 to maximise contact between the air and the fluid flowing through the throat regions 143. In addition, in any given situation, the width W of the throat regions 143 is selected to minimise the ineffective zone in the fluid in the central region of the throat regions 143 where there is neglible penetration of the air entering through holes 25 and therefore minimal if any gas fluid contact. It is noted that, effective gas fluid contact occurs relatively close to where the gas is admitted.

It has been found by the applicant in a series of experiments to aerate an aqueous leach liquor with air that the power requirements to operate the axial flow impellers 14, 33 are relatively low.

The series of experiments was carried out on a 30 m$^3$ reactor of the type shown in FIGS. 1 to 4 having a bank of six rather than four aerators 38. The aerators 38 had a throat width W of 9 mm and a throat length L of 296 mm.

Figure 5:
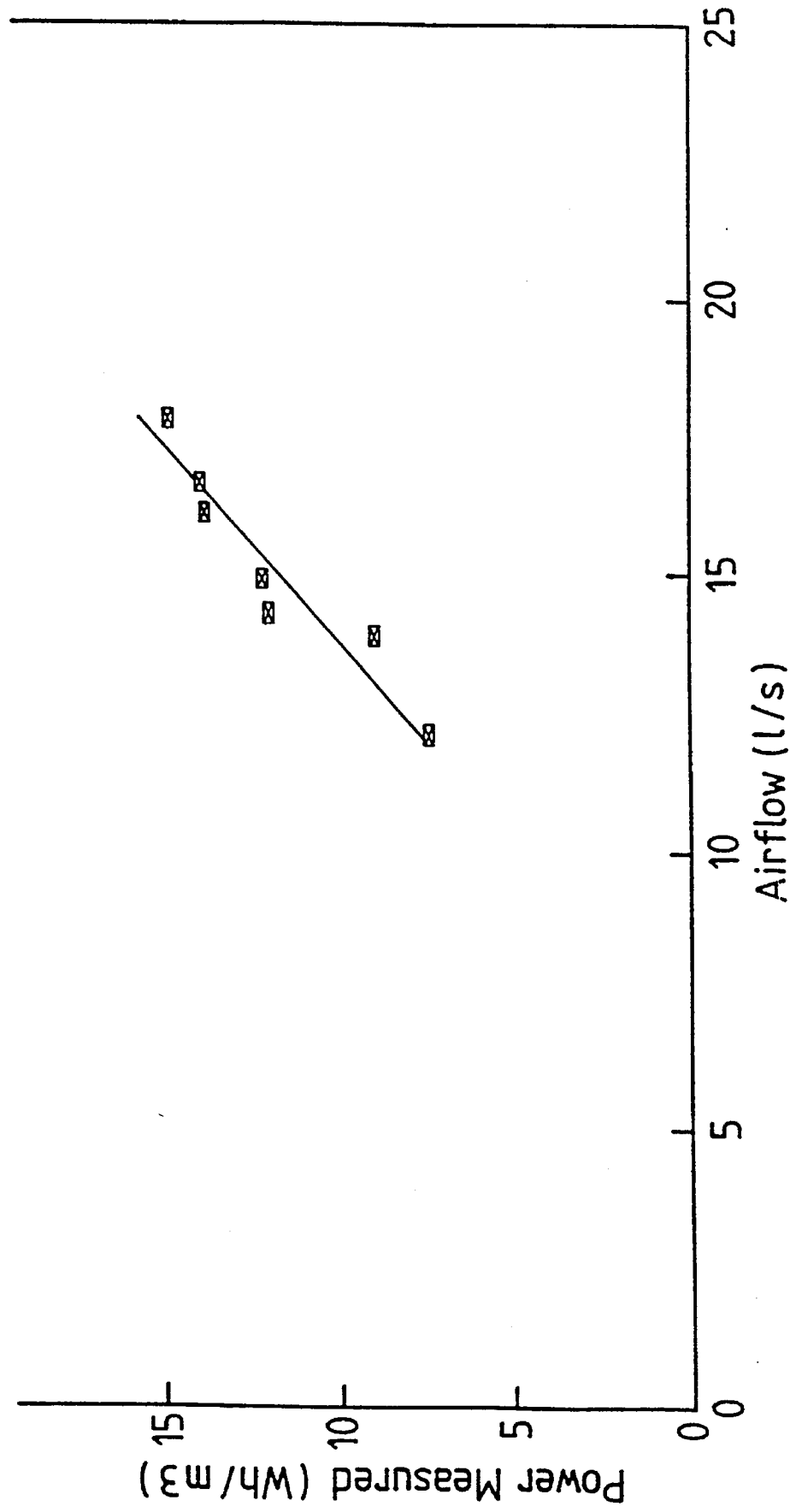
FIG. 5 is a graph of power requirements versus air flow rate for an experimental reactor of the general type shown in FIGS. 1 to 4.

The results of the experiments are shown in FIG. 5. FIG. 5 is a plot of the relationship between the power consumed by the axial flow impellers 14,33 (in terms of Wh/m$^3$ of air entrained) versus the air entrained. On the basis of the results shown in FIG. 5 and on power requirement calculations, the applicant believes that the power requirements for a full scale commercial reactor would be less than 10 Wh/m$^3$.

It has also been found unexpectedly by the applicant in a series of experiments to aerate an aqueous leach liquor with air with venturi aerators that as the flow rate of the liquor increases it is possible to introduce significantly higher amounts of air into the liquor with aerators which have an elongate slot configuration in the throat region, such as the aerators 38 shown in FIGS. 3 and 4, than with conventional aerators which have a throat region of circular cross-section.

The experiments were carried out on an aerator of the basic construction of the aerators 38 shown in FIGS. 3 and 4 having a throat width W of 9 mm, throat length L of 200 mm, and 384 holes of 1 mm diameter and 3 conventional aerators having:

(a) a throat diameter of 25 mm and 96 holes of 1 mm diameter;

(b) a throat diameter of 18 mm and 48 holes of 1 mm diameter; and (c) a throat diameter of 36 mm and 72 holes of 1 mm diameter.

Figure 6:
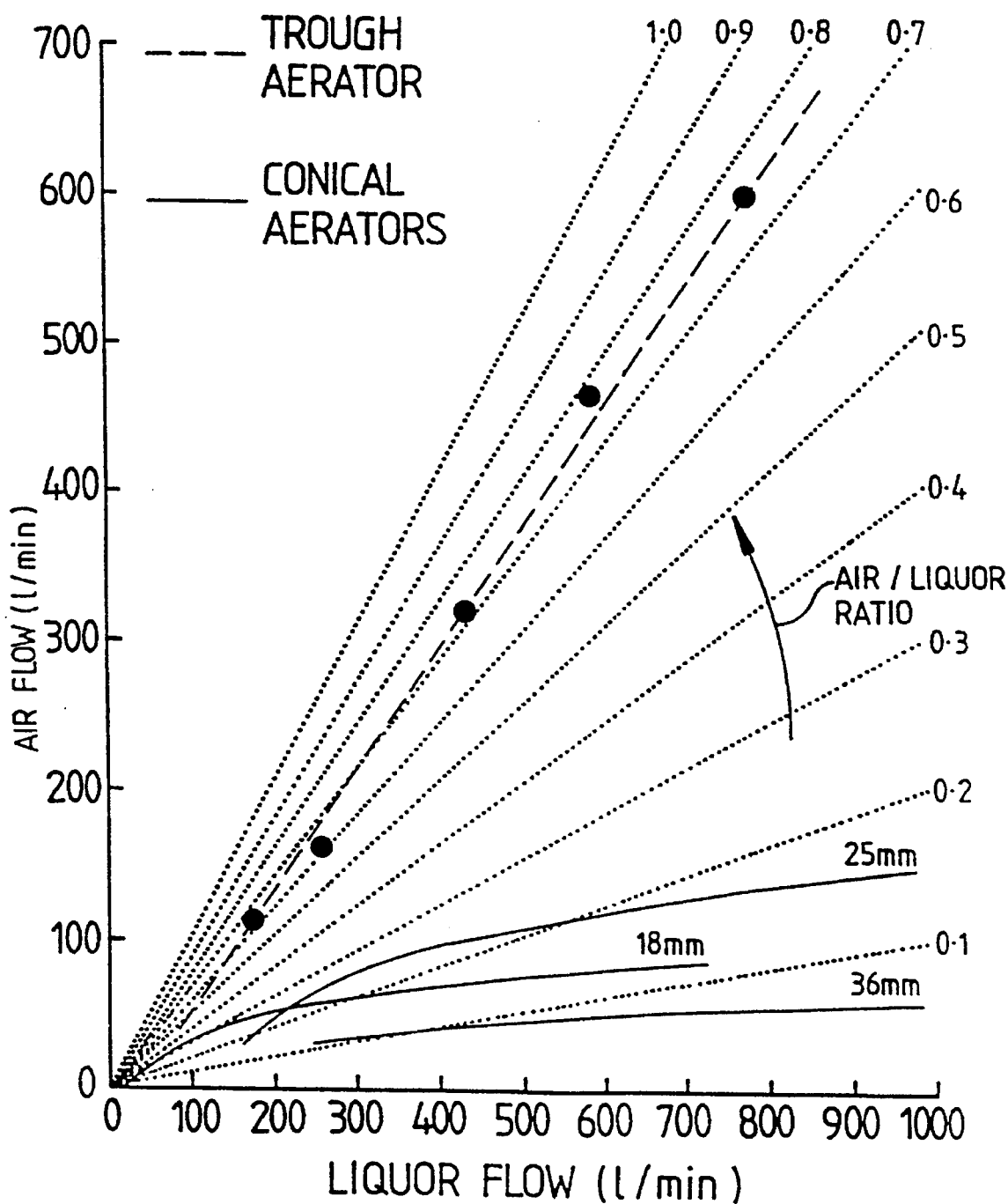
FIG. 6 is graph of air flow rate versus liquor flow rate for a venturi aerator having an elongate slot configuration in the throat region in the reactor of the type shown in FIGS. 1 to 4 and a conventional venturi aerator having a circular configuration in the throat region.

The results of the experiments are shown in FIG. 6. FIG. 6 is a plot of the relationship of the air flow rate that could be drawn by natural aspiration into the aerators against the flow rate of liquor through the aerators. The dotted lines on the figure represent 0.1 increments of the volume ratio of air flow rate to liquor flow rate. The air to liquor rate is a measure of the efficiency of the aerators.

FIG. 6 shows that the air flow rate that was drawn by natural aspiration of the aerator 38 (referred to as "trough aerator" in the figure) increased linearly with the flow rate of liquor through the aerator 38, whereas the air flow rate that was drawn by natural aspiration into the conventional aerators (referred to as "conical aerators" in the figure) levelled off at relatively low liquor flow rates.

In addition, FIG. 6 shows that the air to liquor ratio of the aerator 38, particularly at high liquor flow rates, was considerably higher than that of the conventional aerators and the difference in efficiency of the aerators, as reflected by this parameter, became increasingly marked as the liquor flow rate increased. The relatively high air to liquor ratio, particularly at high liquor flow rates, is an important feature of the aerator 38 because it enables the capital and operating costs associated with aeration to be minimised.

Figure 7:
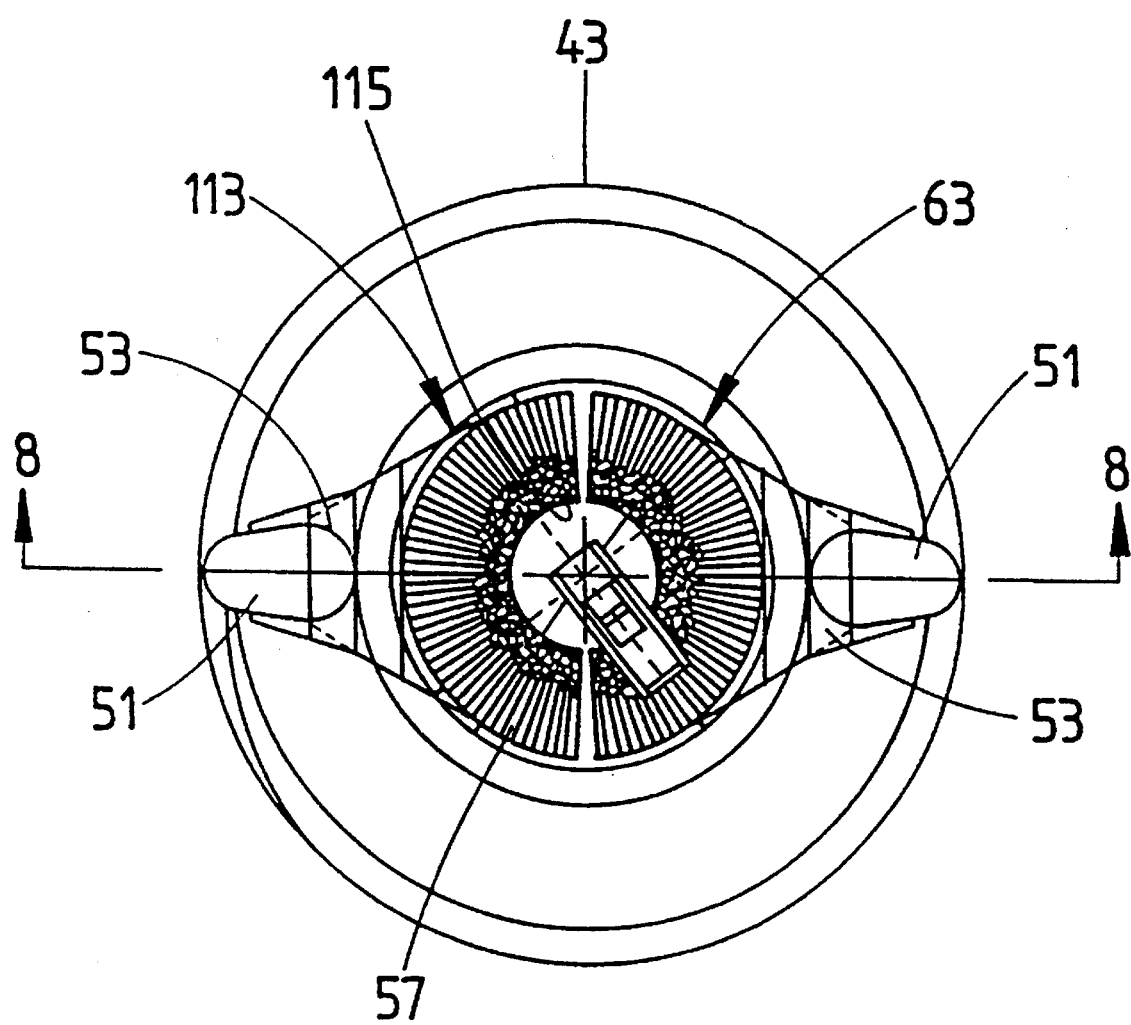
FIG. 7 is a top plan view of another preferred embodiment of a reactor formed in accordance with the invention.
Figure 8:
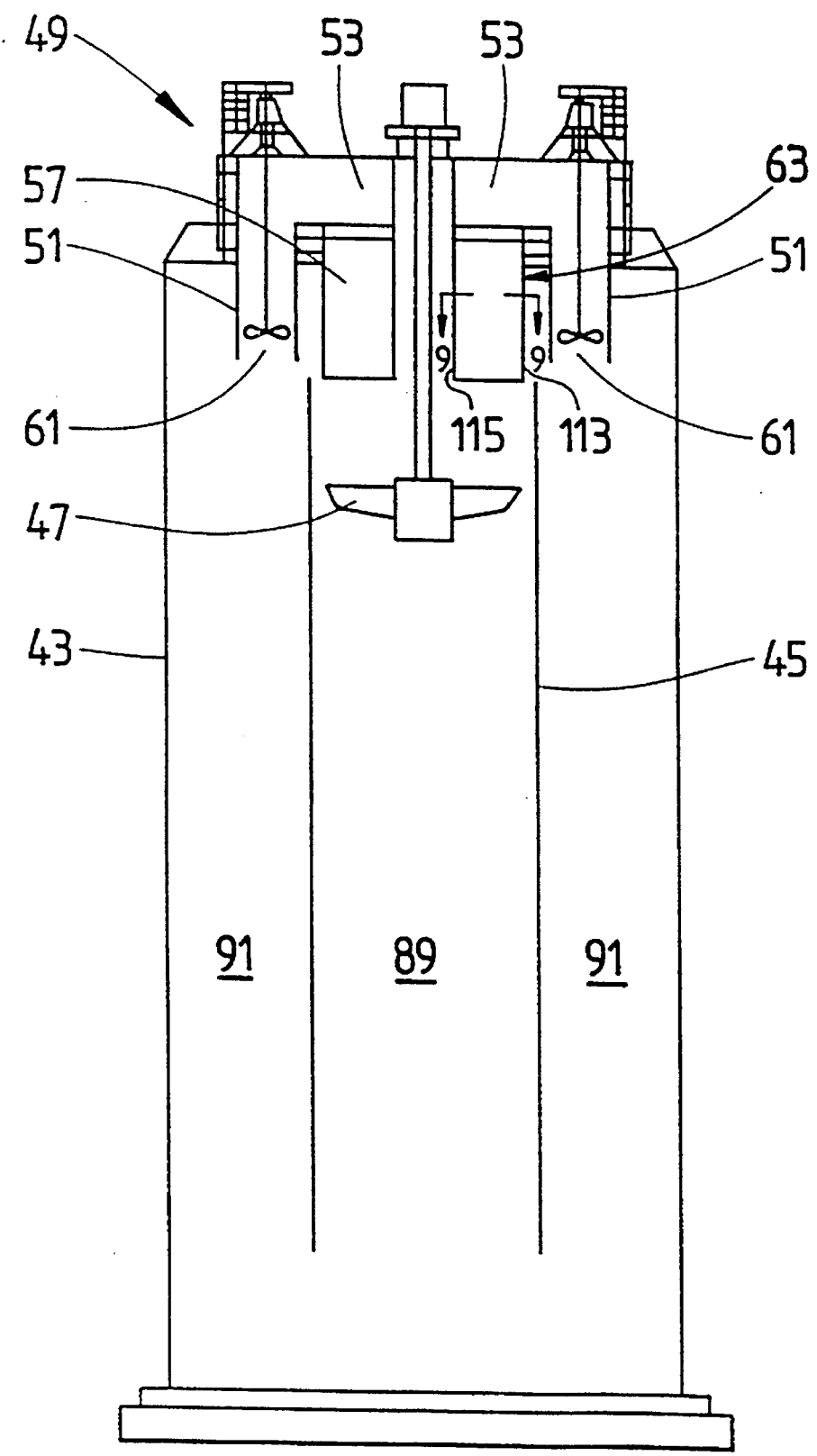
FIG. 8 is a section along the line 8—8 in FIG. 7.

The preferred embodiment of the reactor 41 shown in FIGS. 7 to 9 is similar to that shown in FIGS. 1 and 2 and comprises a cylindrical mixing tank 43 containing the slurry, a vertical draft tube 45 submerged in the slurry which divides the tank 43 into an inner chamber 89 and outer chambers 91, a motor driven axial flow impeller 47 located in the draft tube 45 near the top thereof, and an aerator assembly, generally identified by the numeral 49, supported by any suitable means (not shown) to extend into the tank 43.

The aerator assembly 49 comprises a venturi aerator 63 located directly above the draft tube 45, two inlets 51 located adjacent the side wall of the tank 43, and a motor driven axial flow pump 61 located in each inlet 51. The aerator assembly 49 further comprises channels 53 which connect the inlets 51 to the venturi aerator 63.

With reference to FIGS. 7 and 9, the venturi aerator 63 comprises an annular array of aerators 57 which are the same basic construction as the aerators 38 shown in FIGS. 3 and 4 separated by air delivery channels 81. The aerators 57 are arranged so that the elongate throat regions 83 extend radially and the open ends of the air delivery channels 81 form part of the outer and inner sides 113, 115 of the venturi aerator 63. With such an arrangement air can flow with unrestricted access through the open ends into the air delivery channels 81 and then through the openings (not shown) in the air delivery channels 81 into the throat regions 83 of the aerators 57.

The preferred embodiments of the reactors shown in the drawings have low head requirements and low friction losses in the aerator assemblies. As a consequence, the reactors can operate efficiently with low head axial flow pumps whereas centrifugal pumps, which are commonly used to pump fluids, would operate less efficiently. In addition, the reactors allow the axial flow pumps to operate at low impeller tip speeds which is important in a mineral slurry to avoid excessive wear. Specifically, it has been found by the applicant that the power requirements to operate the impellers to draw the slurry into and through the aerator assemblies are significantly lower than to pump the slurry through the external circuit disclosed in International application PCT/AU92/00645.

Other advantages of the invention are that the reactors are compact and self-contained and the aerator assemblies are readily accessible for maintenance.

In addition, the reactors are capable of allowing a large volume of fluid to be circulated in the mixing tank and aerated with a large volume of air by natural aspiration.

Many modifications may be made to the preferred embodiments of the reactor without departing from the spirit and scope of the invention.

In this regard, whilst the preferred embodiments comprise cylindrical draft tubes 45 located centrally in a cylindrical mixing tanks 12,43 to divide the mixing tanks 12,43 into inner chambers 21,89 and outer annular chambers 23, 91, it can readily be appreciated that the invention is not so restricted and extends to any configuration of partition means to divide a mixing tank into at least two chambers through which fluid can circulate.

Furthermore, whilst the preferred embodiment shown in FIGS. 1 to 4 comprises a bank of four aerators 38 arranged side by side, it can readily be appreciated that the invention is not so restricted and extends to any suitable number of aerators 38 arranged in any suitable configuration.

Furthermore, whilst the aerator assemblies 29, 49 of the preferred embodiments comprise throat regions 143, 83 which have a uniform width W, it can readily be appreciated that the invention is not so restricted.

Furthermore, whilst the preferred embodiment shown in FIGS. 7 to 9 comprises a plurality of aerators 57 arranged side by side in an annular array so that the elongate throat regions 83 extend radially and the air delivery channels 81 are of truncated wedge-shaped configuration, it can readily be appreciated that the invention is not so restricted and extends to any other suitable arrangement. For example, the aerators 57 may be arranged side by side in banks in which the aerators 57 of each bank are parallel and the banks are positioned in an annular array so that the elongate throat regions 83 extend generally radially. By way of further example, the banks of parallel aerators 57 may be arranged in an annular array so that the elongate throat regions 83 extend transversely to a radial axis.

Furthermore, whilst the channels 35, 53 of the aerator assemblies 29, 49 of the preferred embodiments are shown as fully enclosed units, it can readily be appreciated that the invention is not so restricted and the channels may be open-topped or otherwise vented to allow separation from the fluid of gases that are evolved or produced in a mixing tank.

Furthermore, whilst the aerator assemblies 29, 49 of the preferred embodiments are located in the mixing tanks 12, 43, it can readily be appreciated that some aspects of the invention are not so restricted and the aerator assemblies 29, 49 may be located externally of a mixing tank.

Furthermore, whilst the aerator assemblies 29, 49 of the preferred embodiments comprise aerators 38, 57 having an elongate slot configuration in the throat regions 143, 83 it can readily be appreciated that some aspects of the invention are not so restricted and the aerator assemblies may comprise aerators having a circular cross-section in the throat regions.

We claim:

1. A reactor for introducing a gas into a fluid comprising, a mixing tank for the fluid, a partition means for dividing the tank into at least two chambers, a first pump means located in one of the chambers for circulating the fluid downwards in one chamber and then upwards in the other chamber, an aerator assembly for separating and thereafter aerating a sidestream of the fluid from the circulating fluid in the tank and introducing the aerated fluid into the tank for mixing the aerated fluid with the circulating fluid in the tank, the aerator assembly comprising a venturi aerator and a second pump means for circulating the sidestream of the fluid from the tank throughout the aerator, the aerator having:

(a) an aerator inlet;

(b) an aerator outlet;

(c) a constriction intermediate the aerator inlet and the aerator outlet for creating a region of reduced pressure in the fluid, the constriction being elongate in a section transverse to the direction of flow of the fluid through the constriction; and (d) a means for introducing the gas into the constriction to aerate the fluid.

2. The reactor defined in claim 1, wherein the aerator is located in an upper region of the tank.

3. The reactor defined in claim 1, wherein the means for introducing the gas into the constriction comprises an array of jets or holes or a porous membrane in a wall of the constriction.

4. The reactor defined in claim 3, wherein the array of jets or holes and the porous membrane extends substantially around the perimeter of the constriction.

5. The reactor defined in claim 1, wherein the aerator assembly further comprises an aerator assembly inlet located adjacent a side wall of the tank.

6. The reactor defined in claim 5, wherein the second pump means is located in the aerator assembly inlet.

7. The reactor defined in claim 6, wherein the aerator assembly comprises a plurality of the aerators arranged side by side.

8. The aerator defined in claim 7, wherein the aerator assembly further comprises a gas delivery channel positioned between adjacent constrictions of the aerators to deliver the gas to the means for introducing the gas into the constrictions.

9. The reactor defined in claim 7, wherein the aerators are arranged side by side in an annular array.

10. The reactor defined in claim 9, wherein the inlet of each aerator is common to the aerators.

11. The reactor defined in claim 10, wherein the partition means divides the tank into an inner chamber and an outer chamber.

12. The reactor defined in claim 11, wherein the first pump means is located in an upper section of the inner chamber.

13. The reactor defined in claim 12, wherein the first pump means comprises an axial flow impeller.

14. The reactor defined in claim 13, wherein the impeller is operable to circulate the fluid downwardly in the inner chamber and upwardly in the outer chamber.

15. A reactor for introducing a gas into a fluid comprising, a mixing tank for the fluid, a partition means for dividing that tank into at least two chambers and for allowing the fluid to flow between the chambers, a first pump means located in one of the chambers for circulating the fluid downwards in one chamber and then upwards in the other chamber, an aerator assembly located in an upper region of the tank for separating and thereafter aerating a sidestream of fluid from the circulating fluid in the tank and introducing the aerated fluid into the tank for mixing the aerated fluid with the circulating fluid in the tank, the aerator assembly comprising a venturi aerator for the fluid and a second pump means for circulating the sidestream of the fluid from the tank through the aerator.

16. The reactor defined in claim 15, wherein the aerator assembly comprises an aerator assembly inlet located adjacent a side wall of the tank.

17. The reactor defined in claim 15, wherein the second pump means is located in the aerator assembly inlet.

18. The reactor defined in claim 17, wherein the partition means divides the tank into an inner chamber and an outer chamber.

19. The reactor defined in claim 18, wherein the first pump means is located in an upper section of the inner chamber.

20. The reactor defined in claim 19, wherein the first pump means comprises an axial flow impeller.

21. The reactor defined in claim 20, wherein the impeller is operable to circulate the fluid downwardly in the inner chamber and upwardly in the outer chamber.

22. The reactor defined in claim 21, wherein the aerator comprises, a means for creating a region of reduced pressure in the fluid, and a means for introducing the gas into the fluid in the region of reduced pressure to aerate the fluid.

23. The reactor defined in claim 22, wherein the aerator comprises, an inlet, an outlet and a constriction intermediate the inlet and the outlet for creating the region of reduced pressure, and the constriction is elongate in a section transverse to the direction of flow of the fluid through the constriction.

24. The reactor defined in claim 23, wherein the means for introducing the gas into the constriction comprises an array of jets or holes or a porous membrane in a wall of the constriction.

25. The reactor defined in claim 24, wherein the array of jets or holes and the porous membrane extends substantially around the perimeter of the constriction.

26. A method of aerating a fluid circulating in a mixing tank with air in an aerator assembly comprising:

(a) a plurality of venturi aerators arranged side by side, each venturi aerator defining a region of reduced fluid pressure which is elongate in a section transverse to the direction of flow of the fluid through the region of reduced fluid pressure, and (b) a plurality of air delivery channels positioned between the venturi aerators for delivering air to the regions of reduced fluid pressure, the method comprising pumping a sidestream of the fluid through the regions of reduced fluid pressure at a linear velocity in the range of 1 to 10 meters/second, and aerating the fluid by introducing air into the fluid in the region of reduced fluid pressure at a volume ratio of air flow rate to fluid flow rate of at least 0.1.

27. The method defined in claim 26, wherein the venturi aerators are arranged in an annular array.

28. The method defined in claim 27 further comprising, controlling the fluid to flow vertically through the region of reduced fluid pressure.

29. The method defined in claim 28, wherein the fluid is an aqueous leach liquor and the gas is air.

30. The method defined in claim 26, wherein the volume ratio of the air flow rate to the liquor flow rate is at least 0.2.

31. The method defined in claim 30, wherein the volume ratio of the air flow rate to the liquor flow rate is at least 0.3.

32. The method defined in claim 31, wherein the volume ratio of the air flow rate to the liquor flow rate is at least 0.5

33. The method defined in claim 32, wherein the volume ratio of the air flow rate and the liquor flow rate is at least 0.7.

34. The method defined in claim 33, wherein the linear velocity of the liquor through the region of reduced fluid pressure is in the range of 1 to 5 meters/second.

35. The method defined in claim 34, wherein the linear velocity of the liquor through the region of reduced fluid pressure is in the range of 3 to 4 meters/second.

36. The method defined in claim 35 comprising, introducing the gas into the fluid by natural aspiration or at low pressure.

* * * * *